US010882252B2

(12) United States Patent
Garrett et al.

(10) Patent No.: US 10,882,252 B2
(45) Date of Patent: Jan. 5, 2021

(54) VARIABLE FORCE DEPOSITION FOR PRINTING APPLICATIONS

(71) Applicant: INTERNATIONAL BUSINESS MACHINES CORPORATION, Armonk, NY (US)

(72) Inventors: Tynan J. Garrett, Poughkeepsie, NY (US); Andrew Hicks, Wappingers Falls, NY (US); Michael Peter Lyons, Poughkeepsie, NY (US); Miles C. Pedrone, Poughkeepsie, NY (US); Yunli Tang, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 15/843,569

(22) Filed: Dec. 15, 2017

(65) Prior Publication Data

US 2019/0184635 A1 Jun. 20, 2019

(51) Int. Cl.
*B29C 64/241* (2017.01)
*G05B 19/4099* (2006.01)
*B29C 64/118* (2017.01)
*B29C 64/25* (2017.01)
*B33Y 10/00* (2015.01)
(Continued)

(52) U.S. Cl.
CPC ............ *B29C 64/241* (2017.08); *B23K 26/34* (2013.01); *B29C 64/118* (2017.08); *B29C 64/25* (2017.08); *B29C 64/364* (2017.08); *B29C 64/386* (2017.08); *B33Y 10/00* (2014.12); *B33Y 30/00* (2014.12); *B33Y 40/00* (2014.12);
(Continued)

(58) Field of Classification Search
CPC ... B29C 64/241; B29C 64/364; B29C 64/386; B29C 64/25; B29C 64/118; B33Y 40/00; B33Y 50/00; B33Y 30/00; B33Y 10/00; B23K 26/34; G05B 19/4099; G05B 2219/49007
USPC ........................................................ 264/308
See application file for complete search history.

(56) References Cited

U.S. PATENT DOCUMENTS 5,445,513 A * 8/1995 Siggers ............... C06B 21/0008
264/311
9,364,995 B2 * 6/2016 Roberts, IV .......... B29C 64/106
(Continued)

FOREIGN PATENT DOCUMENTS

DE 4308189 C1 * 3/1994 ........... B29C 64/135
EP 0138763 A2 * 4/1985 ....... G01N 27/44704
WO 2017011456 A1 1/2017

OTHER PUBLICATIONS

9 Basic Types of 3D Printers—3D Printing Technology Guide | All3DP; Author—Anatol Locker; Jul. 20, 2017; www.all3dp.com/1/types-of-3d-printers-3d-printing-technology/ printed on Dec. 15, 2017; 12 pages.
(Continued)

*Primary Examiner* — Robert C Dye
*Assistant Examiner* — Guy F Mongelli
(74) *Attorney, Agent, or Firm* — Cantor Colburn LLP; Teddi Maranzano

(57) ABSTRACT

A method for forming an object includes rotating a first object forming device about a rotational axis at a first speed to apply a first force to the first object forming device. The first object forming device includes an additive manufacturing device.

10 Claims, 8 Drawing Sheets

(51) Int. Cl.
*B33Y 30/00* (2015.01)
*B33Y 50/00* (2015.01)
*B23K 26/34* (2014.01)
*B29C 64/386* (2017.01)
*B29C 64/364* (2017.01)
*B33Y 40/00* (2020.01)

(52) U.S. Cl.
CPC .......... *B33Y 50/00* (2014.12); *G05B 19/4099* (2013.01); *G05B 2219/49007* (2013.01)

(56) References Cited

U.S. PATENT DOCUMENTS

| | | | | |
|---|---|---|---|---|
| 2015/0329223 | A1* | 11/2015 | Biddlecom | B64G 1/12 244/171.9 |
| 2015/0352797 | A1* | 12/2015 | Kanada | D01F 6/625 428/212 |
| 2016/0101565 | A1* | 4/2016 | Van Liew | B33Y 10/00 427/256 |
| 2016/0214322 | A1* | 7/2016 | Dudley | B29C 64/129 |
| 2016/0348222 | A1* | 12/2016 | Isaac | B22F 9/10 |
| 2017/0165915 | A1* | 6/2017 | Deng | B29C 64/112 |

OTHER PUBLICATIONS

NASA—3D Printing in Zero-G Technology Demonstration (3D Printing in Zero-G); Dec. 6, 2017; www.nasa.gov/mission_pages/station/research/experiments/1115.html; Page Editor Victor M. Escobedo Jr.; printed on Dec. 15, 2017; 4 pages.

* cited by examiner

VARIABLE FORCE DEPOSITION FOR PRINTING APPLICATIONS

BACKGROUND

The present invention generally relates to additive manufacturing, and more specifically, to variable force deposition for printing applications.

3D printing includes various processes to make 3D objects. Computer control is used to lay successive material layers using a 3D model or another electronic data source to make 3D objects with any shape or geometry.

Originally, the term 3D printing referred to processes that sequentially deposited layers of material onto a powder bed with inkjet printer heads. More recently, the definition of 3D printing has expanded to encompass a wider variety of techniques, such as extrusion and sintering-based processes. Technical standards generally use the term "additive manufacturing" for this broader sense. Binder jetting, robocasting and fused/filament deposition modeling (FDM) are also examples of such additive manufacturing methods. FDM, for example, uses a plastic filament or metal wire, which is unwound from a coil, to supply material to an extrusion nozzle. The nozzle is heated to melt the material, which hardens after extrusion.

SUMMARY

Embodiments of the present invention are directed to a method forming an object. A non-limiting example of the method includes rotating a first object forming device about a rotational axis at a first speed to apply a first force to the first object forming device. Said first object forming device includes an additive manufacturing device.

Another non-limiting example of a method for forming an object includes depositing a first layer of material by an object forming device while rotating said object forming device about a rotational axis at a first rotational speed to apply a first force to said first layer of material, resulting in said first layer of material having a first thickness. Said first object forming device includes an additive manufacturing device.

Embodiments of the invention are directed to a fabrication device. A non-limiting example of the fabrication device includes a casing and a first object forming device arranged in said casing. Said first object forming device is operative to rotate about an axis of rotation while operating. Said first object forming device includes an additive manufacturing device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
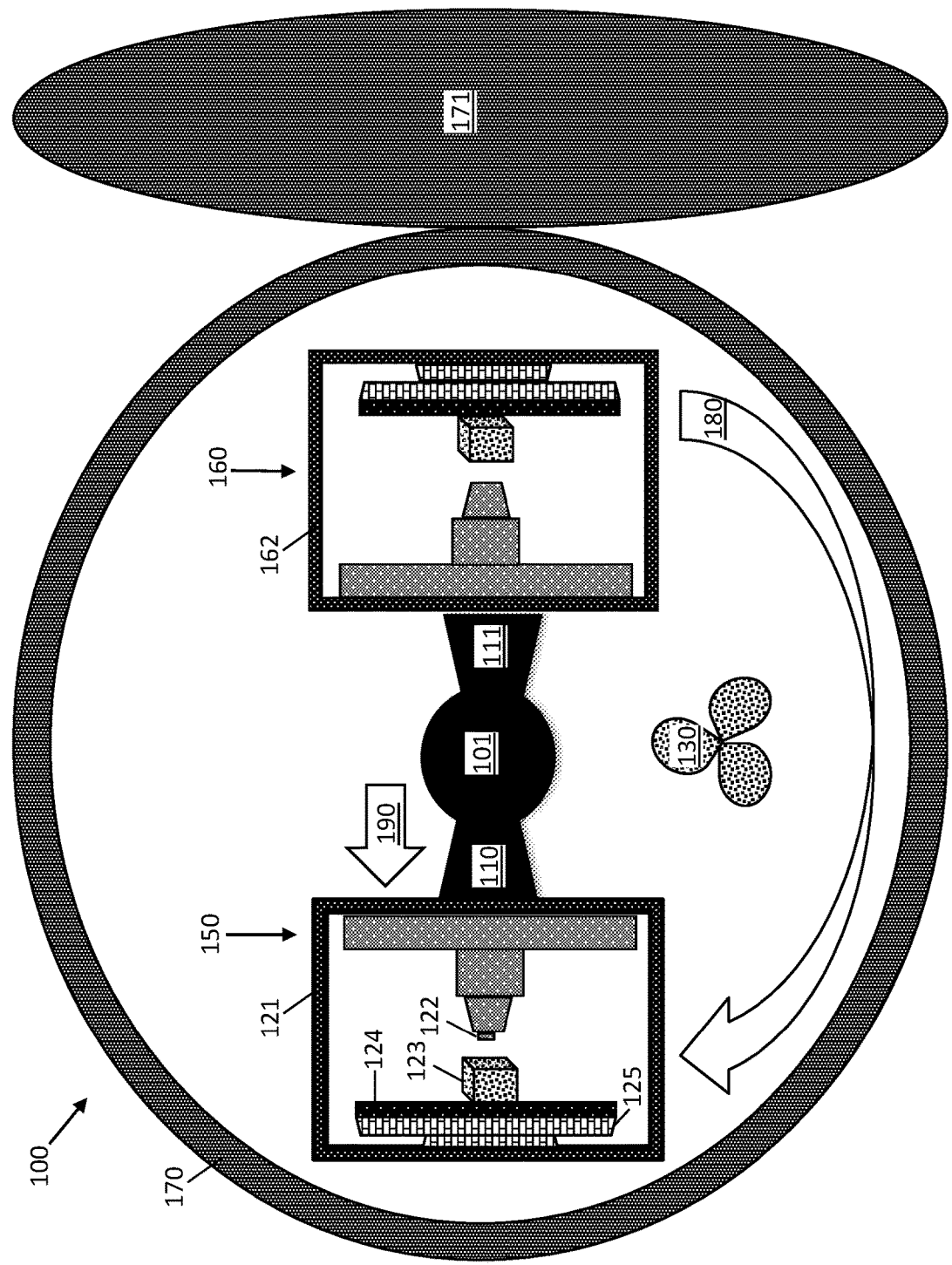
FIG. 1 depicts a top view of a device for forming an object according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, typically 3D printers (or additive manufacturing methods) use the force of gravity to form an object. Thus, utilizing a 3D printer in space, without the full force of gravity that is present on the Earth's surface, can present challenges, as it may be difficult to keep the printed material arranged on the printing surface to create the full additive object. Although using 3D printing to create objects in space is desirable because getting supplies into space presents its own challenges, including planning, physical work, and expense, utilizing these printing methods may not be practical due to the lack of gravity in space. The ability to use additive manufacturing methods, including 3D printers, in space to create objects is advantageous because it allows one to only bring basic materials into space, which can be used to create a variety of objects and only when the objects are needed. This ability would save both time and expense.

Turning now to an overview of the aspects of the invention, one or more embodiments of the invention address the above-described shortcomings by providing the downward force needed for additive manufacturing, including 3D printing, in any environment, such as space. An object forming device, such as a 3D printer, is rotated about a rotational axis at one or more speeds to apply a force that allows the object forming device to form an object, such as a 3D object, in any environment. According to one or more embodiments, a motor is attached to a fixed rotating column, and a 3D printer is then attached to the rotating column by an arm. The column is rotated to create a centrifuge, with the 3D printer attached. The printing bed of the 3D printer is arranged on the outside of the circle created, and as a result, an outward centrifugal force is created that keeps the material pressed to the printing bed.

The above-described aspects of the invention address the shortcomings of the prior art by providing the downward force necessary for a 3D printer to function in an environment without gravity, for example, in space. The technical effects and benefits that result from the enclosed methods and devices include allowing the use of 3D printers in any environment, regardless of the gravitational force present.

Figure 2:
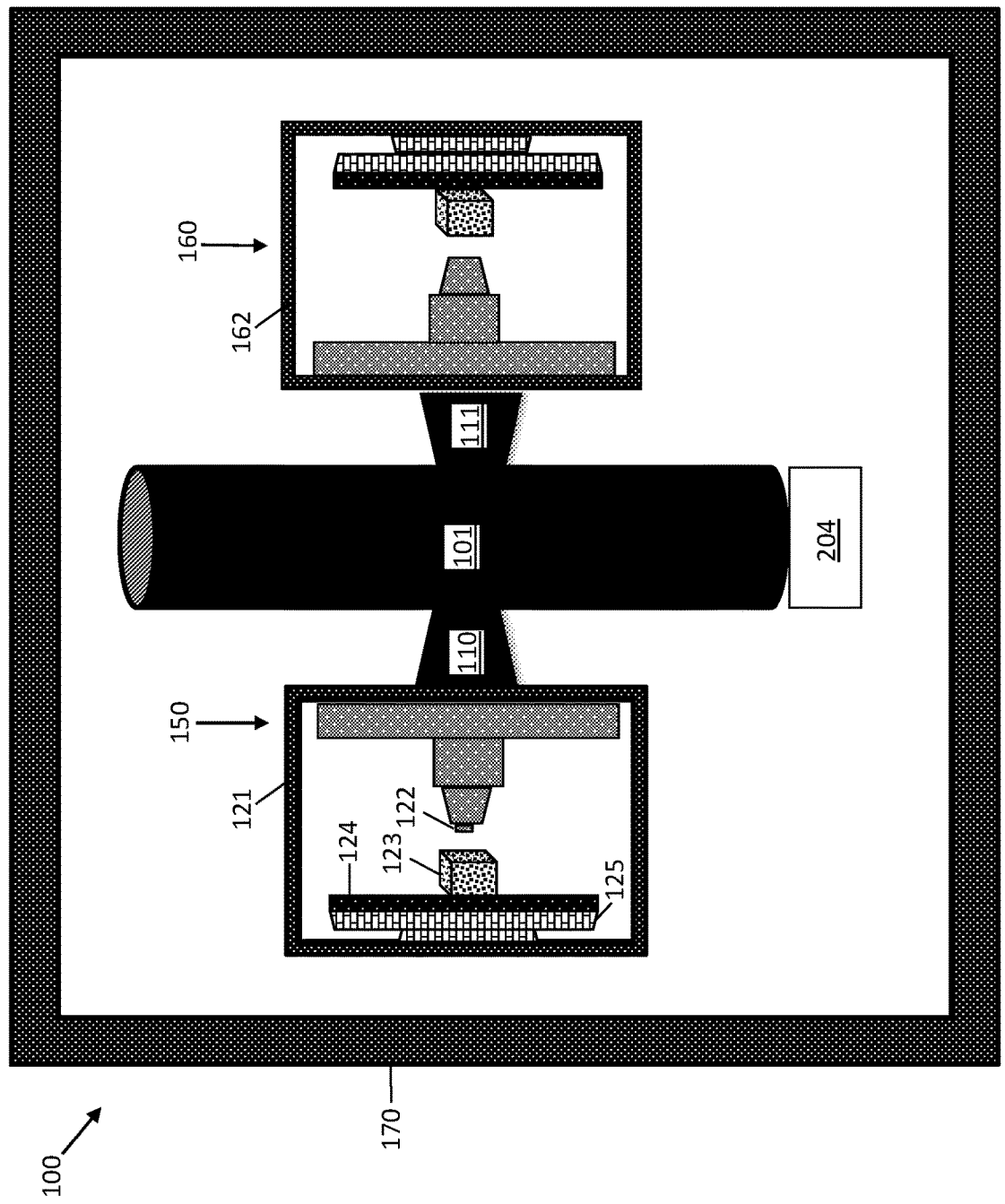
FIG. 2 depicts a cross-sectional side view of a device for forming an object according to embodiments of the invention.

Turning now to a more detailed description of aspects of the present invention, FIG. 1 depicts a top view of a device 100 (fabrication device) for forming an object according to embodiments of the invention. FIG. 2 depicts a cross-sectional side view of the device 100. An object is a 3D object according to one or more embodiments.

The device 100 includes an object forming device 150 (the first object forming device). The object forming device 150 connected to a fixed rotating shaft 101 by an arm 110 (first arm). The arm 110 is operative to secure the first object forming device to the shaft 101. According to one or more embodiments, the shaft 101 is a cylindrical shape. The object forming device 150 is a 3D printer or a device that forms 3D objects by additive manufacturing. The object forming device 150 is operative to deposit a material on a surface within the casing 121. A printing head 122 deposits a material 123 (first material) onto a printing surface 125. The printing surface 125 optionally includes a layer 124 (or coating) that provides a smooth, slick surface so that the material 123 can be easily removed from the printing surface 125. The printing surface 125 itself also can provide the smooth, slick surface. Under normal conditions, the properties of the printing surface are balanced such that the printing surface 125 provides enough "grip" to keep the printed object stationary until printing the formation is complete, while not providing too much grip so that would need a large prying force to remove the object, which would risk damaging the printed object. The device 100 (centrifuge) enables the ability to control the amount of friction between the material 123 and a slick printing surface 125 (printing bed). Higher force provides more friction, which holds the material 123 and final object in place. In contrast, lower force (or no force) means the final object can be easily removed after printing is done. The entire object forming device 150 is enclosed within a casing 121 having an inner cavity.

The fabrication device 100 is enclosed in a housing 170 (casing). The housing 170 is in the shape of a cylinder according to some embodiments. The housing 170 includes a lid 171 that, when closed, provides a sealed environment within an inner cavity defined by the housing 170. The lid 171 can is opened to provide a vent opening.

Figure 3:
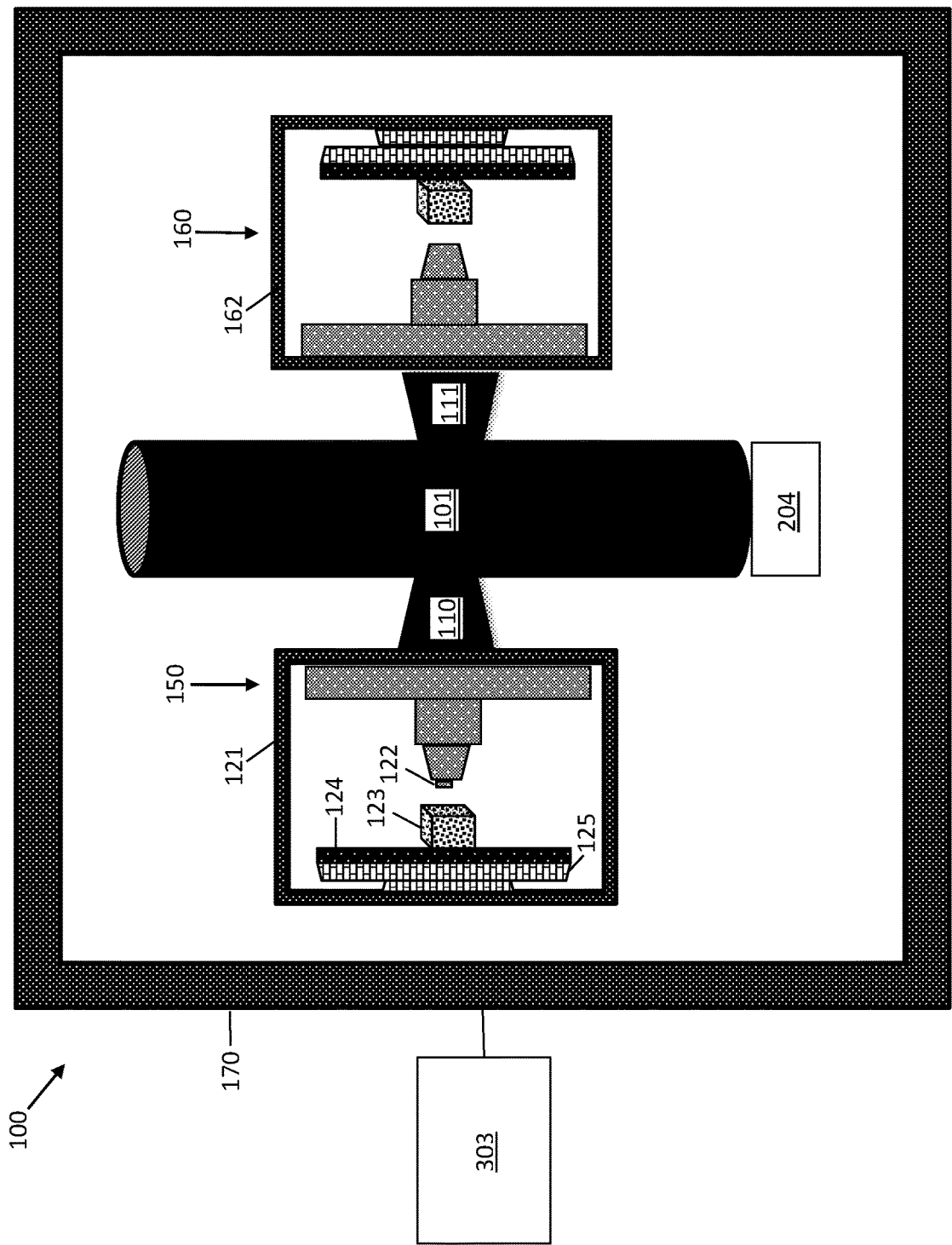
FIG. 3 depicts a cross-sectional side view of a device for forming an object according to embodiments of the invention.

The first object forming device 150 is counterbalanced with either another device (second object forming device 160) as shown in FIGS. 1-3, or another type of balancing weight. When a second object forming device 160 is used, the second object forming device 160 is attached to the shaft 101 by another arm 111. The second device 160 is also enclosed in a casing 162 and operative to deposit a second material on a surface (printing surface) within the casing 162.

As shown in FIGS. 2 and 3, the fixed shaft 101 is connected to a motor 204 and a controller 303 (see FIG. 3). The motor 204 is operative to induce rotation of the object forming device 150 about an axis of rotation. The shaft 101 is arranged substantially concentrically to the axis of rotation. To operate the device 100, the lid 171 (FIG. 1) is closed to form a sealed environment. The sealed environment can be maintained at a fixed pressure and/or temperature. In operation, the shaft 101 rotates in a circular path 180 (FIG. 1) at a predetermined speed (first speed) around the fixed central axis (rotational axis) to apply a force 190 (first force) to the object forming devices 150, 160 within the housing 170. The shaft 101 rotates together with the object forming device 150 (and object forming device 160 when present).

The force 190 is a centrifugal force that is substantially perpendicular to the fixed central axis of rotation (rotational axis). When the object forming devices 150, 160 are rotated about a rotational axis at a first speed, the force 190 is applied to the object forming devices 150, 160.

The printing surface 125 of the object forming device 150 is arranged on the periphery or outside the boundary of the circular path 180 (see FIG. 1). The surface 125 is arranged perpendicular to or normal to the force 190 resulting from the rotation of the shaft 101. Thus, when the material 123 is deposited on the surface 125 during rotation about the central rotational axis, the outward centrifugal force keeps the material 123 arranged on the printing surface 125.

The outward centrifugal force enables the formation of 3D objects using any type of 3D printer in any type of environment, with or without gravity, because the central rotation provides the downward force. The fabrication device 100 functions as a centrifuge and can be used in space or in an environment any distance from the Earth's surface where the gravitational force is less than 9.8 meters/second (m/s). The fabrication device 100 also can be used in an environment where the gravitational force is about 9.8 m/s, for example on the Earth's surface.

The rotational speed (rotations per minute) used for the fabrication device 100 depends on the type of material(s) used and type of object forming device 150. The controller 303 includes a processor 403 operative to control the rotational speed of the object forming device 150 (see FIG. 4). The first material 123 can be, but is not limited to, metals, thermoplastics, acrylics, modeling foams, waxes, woods, or a combination thereof.

The rotational speed used for the fabrication device 100 can be varied to adjust the force 190 applied to the object forming devices 150, 160. According to one or more embodiments, the object forming device 150 is rotated at a first speed (first rotational speed) to apply a first force and then rotated at a second speed (second rotational speed) to apply a second force that is different than the first force (dissimilar from the first force). The speeds and resulting applied forces can be increased or decreased any number of times to form the final object.

Rotating the object forming device 150 deposits a layer of material 123 (first layer of material) on the printing surface 125. The first layer of material 123 has a first thickness, which can vary and depends on the type of material and object being formed. Successive layers of materials are then arranged on the first layer of material 123, each successive layer (second, third, fourth, etc.) having a defined thickness (second thickness, third thickness, fourth thickness, etc.). When the force 190 applied to the object forming device 150 is varied by increasing or decreasing the rotational speed, the thicknesses of the resulting layers of materials may also be dissimilar. For example, when first and second forces are applied for first and second material layers that include the same material composition, the thicknesses of the first and second material layers also may be dissimilar.

According to exemplary embodiments, variable force deposition is used to surround a wire or conduit within a heavier conducting material. A first layer of material is formed as a thin layer of material, for example, a plastic or other light material, on the printing surface. The first thin layer creates a "wire." Then a second layer of material is formed on the first layer. The second layer includes a heavier material, such as a conductor. While the second material is being deposited in a high temperature state, the force applied to the print bed is increased to induce the lighter first layer under the heavier hot material to be partially displaced and substantially surround the first material. Then another layer, a third layer of heavy conducting material, is printed on top of the second layer. The wire of conduit of the first material layer is then surrounded by the heavier conducting material of the second and third layers of material.

According other exemplary embodiments, variable force deposition is used to form layers that are below the minimum size that the print head can produce. For example, two lines of material can be formed adjacent to one another, with a small gap between the two lines. The gap between the two lines of material can then be filled with a very thin layer, which generally may not be possible due to constraints of the print head. However, increasing the amount of downward force applied while forming (printing) a third thin layer of material, in the liquid state, in the gap between the first two lines enables filling the small gap space. As a result of the variable force deposition, the two lines of the original material (which is the smallest the printer could extrude) is higher (taller) than the third line of material in the gap.

After formation of the object is completed, the object forming device 100 can be vented and cooled by opening the lid 171. The device 100 includes a cooling fan 130 within the housing 170 in some embodiments.

In one or more embodiments (as shown in FIGS. 1-3), the first object forming device 150 and second object forming device 160 are arranged at fixed angles with respect to the central axis of rotation (shaft 101). The fixed angle is about 45° according to one or more embodiments. In other embodiments, the first object forming device 150 and second object forming device 160 are connected to the shaft 101 in a swinging bucket orientation such that the devices swing out to an angle greater than 45° when the shaft 101 rotates. According to one or more embodiments, the first object forming device 150 and second object forming device 160 are arranged at an angle of about 90° relative to the central axis of rotation.

Figure 5:
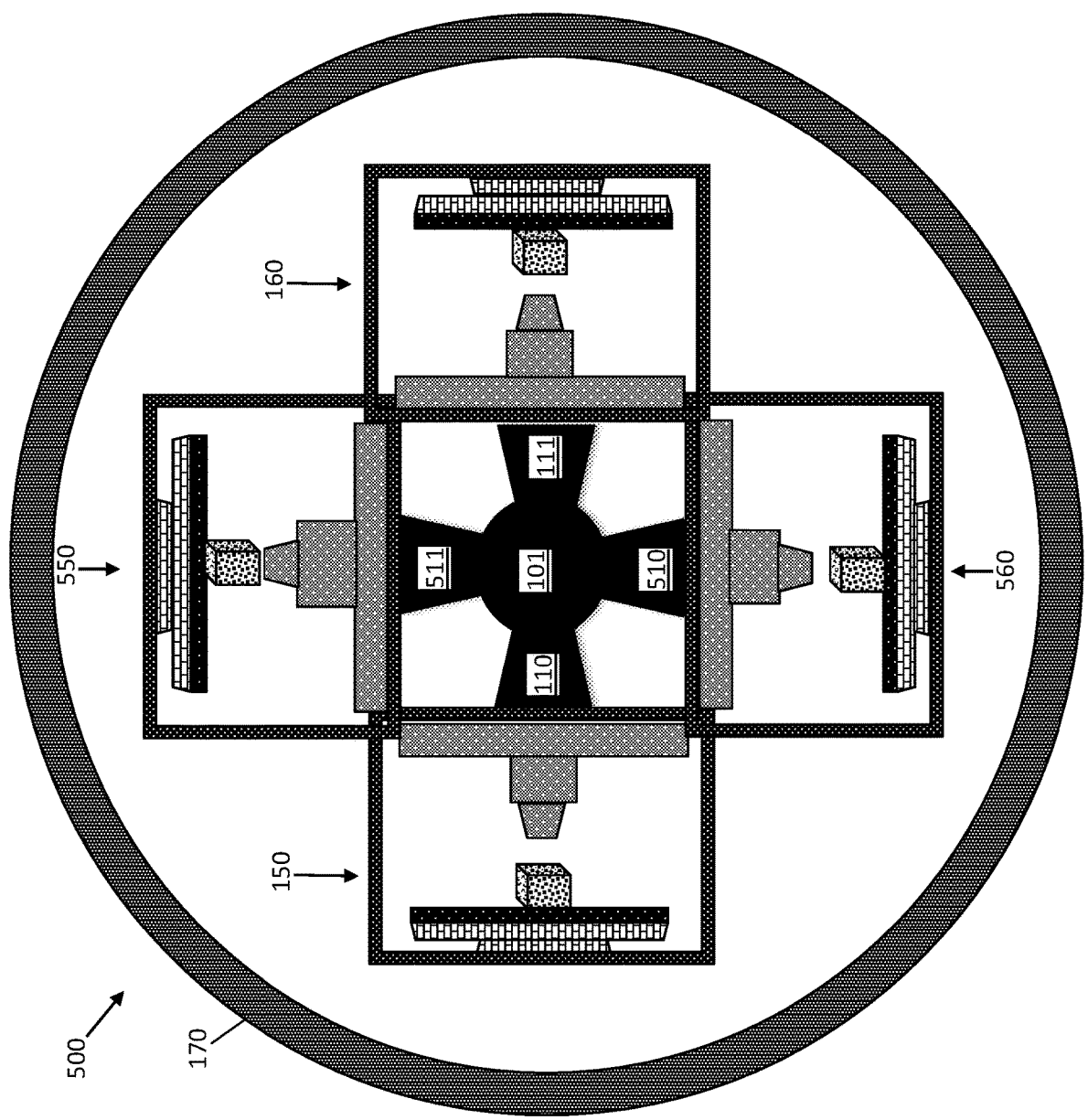
FIG. 5 depicts a top view of a device for forming an object according to embodiments of the invention.

The fabrication device 100 includes any number of object forming devices. Although FIGS. 1-3 show two devices, the fabrication device 100 may include one, two, three, four, five, six, or more object forming devices enclosed in the housing 170. As shown in FIG. 5, a fabrication device 500 for forming an object includes a first object forming device 150, a second object forming device 160, a third object forming device 550, and a fourth object forming device 560. The first object forming device 150, second object forming device 160, third object forming device 550, and fourth object forming device 560 are arranged in a circle around the central rotating shaft 101 within the housing 170. The third object forming device 550 is connected to the shaft 101 by a third arm 511, and the fourth object forming device 560 is connected to the shaft 101 by a fourth arm 510.

A series of object forming devices enclosed in individual casings and operative to deposit materials on a surface within the individual casings can be arranged in a housing in any orientation to create a 3D printing factory. Each object forming device can be used to form/print a different object or different portion of a single object for efficient fabrication.

Figure 8:
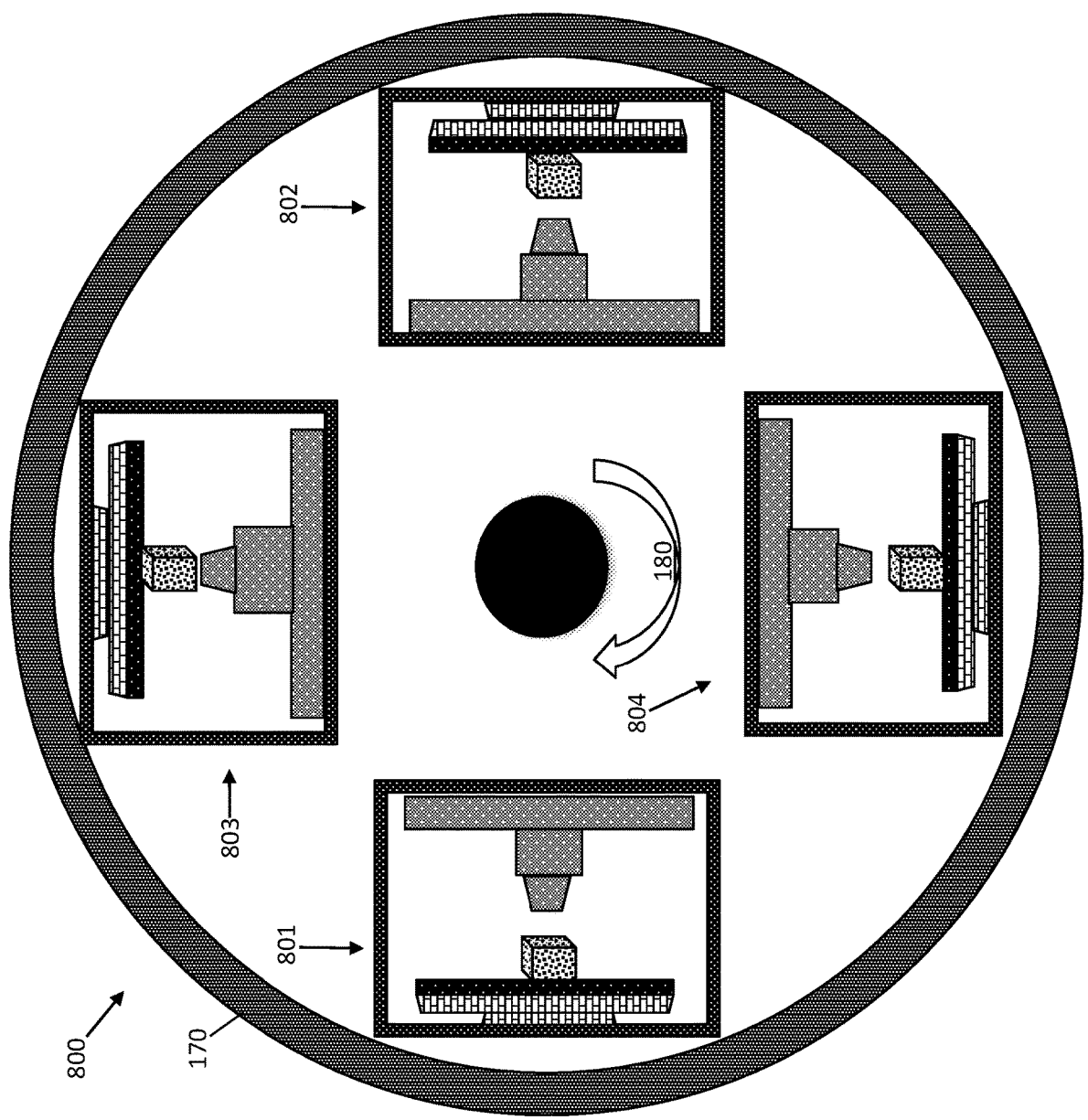
FIG. 8 depicts a top view of a device for forming an object according to embodiments of the invention.

FIG. 8 depicts a top view of a device for forming an object according to embodiments of the invention. A fabrication device 800 includes a first object forming device 801, a second object forming device 802, a third object forming device 803, and a fourth object forming device 804. The first object forming device 801, second object forming device 802, third object forming device 803, and fourth object forming device 804 are arranged along the outside periphery of the housing 170. Although four object forming devices are shown, the fabrication device 800 can include any number of object forming devices. In operation, the fabrication device 800 rotates in a circular path 180 at a predetermined speed (first speed) around the fixed central axis (rotational axis) to apply a force 190 to the object forming devices.

The object forming device 150 (as well as any additional object forming devices) can be any forming of additive printing device. According to one or more embodiments, the object forming device 150 is a fused deposition modeling (FDM) printer. The FDM printer heats and then extrudes a thermoplastic filament through an extrusion head. The extrusion head deposits the molten plastic onto a surface in X and Y coordinates. The surface (build table) lowers the object layer by layer in the Z direction to form a 3D object. The 3D object is built from the bottom up.

According to one or more embodiments, the first object forming device 150 is a stereolithography (SLA) printer. SLA printers expose a layer of photosensitive liquid resin to an ultraviolet (UV) laser beam to harden the resin into a solid. Once the laser has swept a layer of resin in the desired pattern and it begins to harden, the model-building platform in the liquid tank of the printer steps down the thickness of a single layer, and the laser begins to form the next layer. Each layer is built on top of the preceding one. The object is rinsed with a solvent after printing has been completed, as well as optionally baked in a UV oven to complete processing. An advantage of using SLA printing in embodiments of the invention is that the centrifugal force helps drain more of the excess liquid resin from the printed object. As a result, less cleaning is needed, and more resin is saved for future prints, instead of being flushed away with the solvent.

According to one or more embodiments, the first object forming device 150 is a digital light processing (DLP) printer. DLP printers use a liquid photopolymer that is cured with a special projector. DLP uses a computer-controlled, micro-mirror grid, laid out on a semiconductor chip.

According to one or more embodiments, the first object forming device 150 is a selective laser sintering (SLS) printer. SLS printers use powdered materials and a laser to selectively sinter a layer of granules, which binds the material together to create a solid structure. The powdered materials can be, for example, nylon, glass, ceramics, or metals, such as aluminum, silver, or steel.

According to one or more embodiments, the first object forming device 150 is a selective laser sintering melting (SLM) printer. SLM printers are a type of SLS printer that use a high powered laser beam to fully melt metallic powders into solid 3D parts. The metallic powders can be, for example, stainless steel, aluminum, titanium, or cobalt chrome.

According to one or more embodiments, the first object forming device 150 is an electron beam melting (EBM) printer. EBM printers use a computer-controlled electron beam under high vacuum to fully melt a metallic powder at high temperatures, for example, up to 1000° C.

According to one or more embodiments, the first object forming device 150 is laminated object manufacturing (LOM) printer. LOM printers use layers of adhesive-coated paper, plastic or metal laminates, which are fused under heat and pressure and shaped by cutting with a computer controlled laser or knife. The 3D object is created layer-by-layer, and after the excess material is cut away, the object can be sanded or sealed with paint.

According to one or more embodiments, the first object forming device 150 is a binder jetting (BJ) printer. BJ printers use two materials, a powder based material, and a bonding agent. The bonding agent functions an adhesive between powder layers. The materials are extruded in liquid form from a print head. After one layer is finished, the build plate is lowered and the process repeated. BJ printers use, for example, ceramic, metal, sand, or plastic materials.

According to one or more embodiments, the first object forming device 150 is a rapid liquid printer. Rapid liquid printers physically draw a liquid suspension in three-dimensional space that subsequently solidifies and enable the precise creation of customized products.

Figure 4:
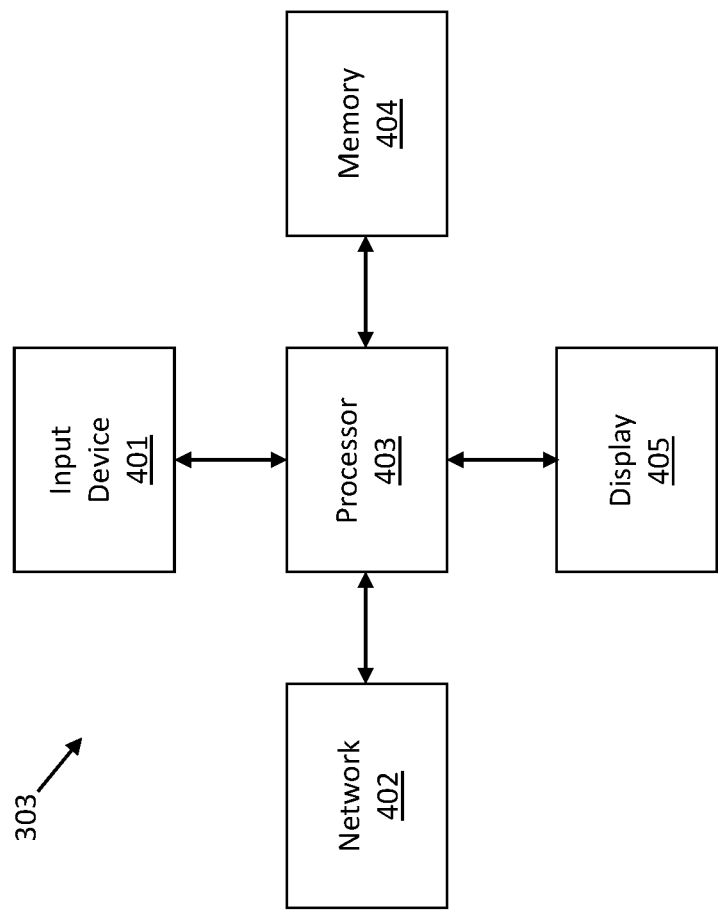
FIG. 4 depicts a portion of a controller for controlling a device for forming an object according to embodiments of the invention.

FIG. 4 depicts a portion of a controller 303 (see also FIG. 3) for controlling the fabrication device 100 for forming an object according to embodiments of the invention. The controller 303 includes a processor 403 that is communicatively connected to an input device 401, a network 402, a memory 404, and a display 405. In the illustrated exemplary embodiment, the input device 401 may include a keyboard, touchpad, mouse, or touch screen device, and the network 402 may include a local area network or the Internet. The display 405 may include a screen, touch screen device or digital display.

In some embodiments, the controller 303 may include a personal computer, smart phone or tablet device communicatively connected to the fabrication device 100.

Figure 6:
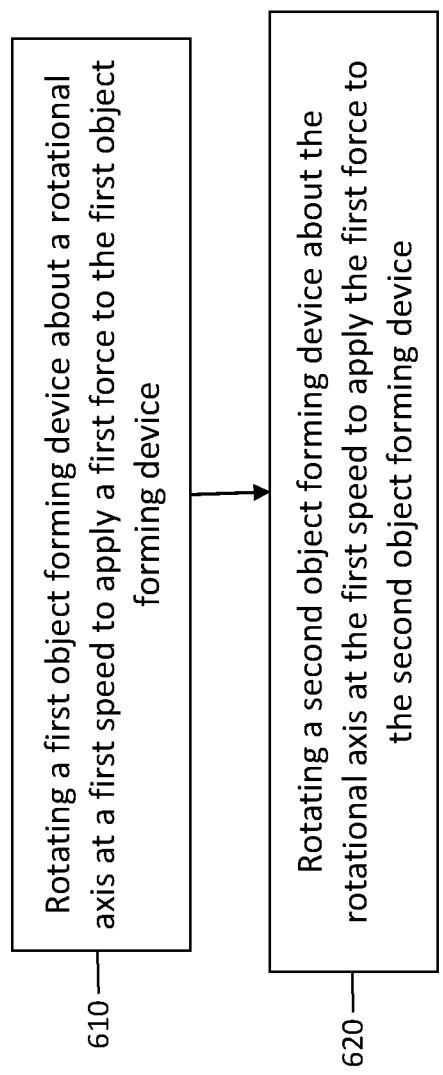
FIG. 6 depicts a flow chart illustrating a method for forming an object according to embodiments of the invention.

FIG. 6 depicts a flow chart illustrating a method for forming an object according to embodiments of the invention. In box 610, the method includes rotating a first object forming device about a rotational axis at a first speed to apply a first force to the first object forming device. In box 620, the method includes rotating a second object forming device about the rotational axis at the first speed to apply the first force to the second object forming device.

Figure 7:
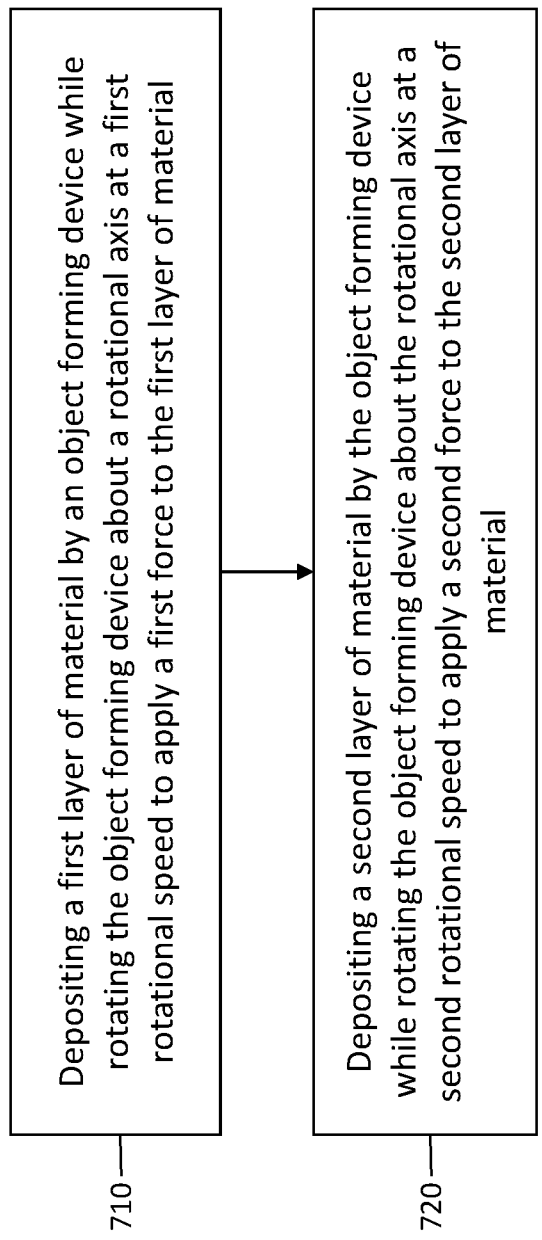
FIG. 7 depicts a flow chart illustrating a method for forming an object according to embodiments of the invention.

FIG. 7 depicts a flow chart illustrating a method for forming an object according to embodiments of the invention. In box 710, the method includes depositing a first layer of material by an object forming device while rotating the object forming device about a rotational axis at a first rotational speed to apply a first force to the first layer of material. In box 720, the method includes depositing a second layer of material by the object forming device while rotating the object forming device about the rotational axis at a second rotational speed to apply a second force to the second layer of material.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for forming an object, the method comprising:
    rotating a first object forming device and a second object forming device about a rotational axis in a circular path at a first speed to apply a first force to the first object forming device and the second object forming device, the first object forming device and the second object forming device are connected to opposing sides of a rotating shaft by arms, the second object forming device counterbalances the first object forming device, and the rotating shaft is arranged substantially concentrically to the axis of rotation and rotates together with the first object forming device and the second object forming device;
    wherein each of the first object forming device and the second object forming device comprises an additive manufacturing device comprising a printing head and a printing surface enclosed within a casing; and wherein the first object forming device and the second object forming device are further enclosed within a housing.

2. The method of claim 1, further comprising rotating the first object forming device about the rotational axis at a second speed to apply a second force to the first object forming device, the second force is dissimilar from the first force.

3. The method of claim 1, wherein the first force includes a centrifugal force.

4. The method of claim 1, wherein the first force is substantially perpendicular to the rotational axis.

5. The method of claim 1, wherein the first object forming device comprises a fused deposition modeling printer, a stereolithography printer, a digital light processing printer, a selective laser sintering melting printer, an electron beam melting printer, a laminated object manufacturing printer, a binder jetting printer, or a rapid liquid printer.

6. A method for forming an object, the method comprising:

depositing a first layer of material by a first object forming device while rotating the first object forming device and a second object forming device about a rotational axis in a circular path at a first rotational speed to apply a centrifugal force to the first layer of material, resulting in the first layer of material having a first thickness, the first object forming device and the second object forming device are connected to opposing sides of a rotating shaft by arms, the second object forming device counterbalances the first object forming device, and the rotating shaft is arranged substantially concentrically to the axis of rotation and rotates together with the first object forming device and the second object forming device;

wherein each of the first object forming device and the second object forming device comprises an additive manufacturing device comprising a printing head and a printing surface enclosed within a casing; and wherein the first object forming device and the second object forming device are further enclosed within a housing.

7. The method for forming the object of claim 6, further comprising depositing a second layer of material by the first object forming device while rotating the first object forming device about the rotational axis at a second rotational speed to apply a second force to the second layer of material, resulting in the second layer of material having a second thickness.

8. The method of claim 7, wherein the second force is dissimilar from the first force, and the second thickness is dissimilar from the first thickness.

9. The method of claim 1, wherein the printing surface of the first object forming device is arranged on an outside boundary of the circular path.

10. The method of claim 9, wherein the printing surface of the first object forming device is arranged perpendicular to the first force.

* * * * *